US006834354B1

(12) United States Patent
Togawa (10) Patent No.: US 6,834,354 B1
(45) Date of Patent: Dec. 21, 2004

(54) METHOD AND APPARATUS FOR ASSIGNING TASKS IN AN INFORMATION PROCESSING SYSTEM TO OPTIMIZE POWER CONSUMPTION VERSUS PERFORMANCE OF THE SYSTEM

(75) Inventor: Atsushi Togawa, Tokyo (JP)

(73) Assignee: Sony Corporation, Tokyo (JP)

( * ) Notice: Subject to any disclaimer, the term of this patent is extended or adjusted under 35 U.S.C. 154(b) by 712 days.

(21) Appl. No.: 09/762,873

(22) PCT Filed: Jun. 16, 2000

(86) PCT No.: PCT/JP00/03973

§ 371 (c)(1),
(2), (4) Date: Feb. 14, 2001

(87) PCT Pub. No.: WO00/77599

PCT Pub. Date: Dec. 21, 2000

(30) Foreign Application Priority Data

Jun. 16, 1999 (JP) ............................................ 11-170211

(51) Int. Cl.$^7$ ................................................ G06F 1/32
(52) U.S. Cl. ...................................... 713/320; 713/322
(58) Field of Search ............................... 713/102, 300, 713/320, 322, 323; 707/102

(56) References Cited

U.S. PATENT DOCUMENTS

| | | | | |
|---|---|---|---|---|
| 5,630,148 A | * | 5/1997 | Norris | 713/322 |
| 6,192,480 B1 | * | 2/2001 | Barrus | 713/320 |
| 6,378,081 B1 | * | 4/2002 | Hammond | 713/501 |

FOREIGN PATENT DOCUMENTS

| | | | | |
|---|---|---|---|---|
| JP | 04044337 A | * | 2/1992 | ........... H01L/21/82 |
| JP | 4-362742 | | 12/1992 | |
| JP | 5-197574 | | 8/1993 | |
| JP | 7-168726 | | 7/1995 | |
| JP | 9-297688 | | 11/1997 | |
| JP | 10-143274 | | 5/1998 | |
| JP | 10-240548 | | 9/1998 | |

* cited by examiner

Primary Examiner—Lynne H. Browne
Assistant Examiner—Paul Yanchus, III
(74) Attorney, Agent, or Firm—Frommer Lawrence & Haug LLP; Williams S. Frommer; Darren M. Simon (57) ABSTRACT

An information processing system includes an operation speed adjustable processor, and is adapted so that, with increase of operation speed of the processor, its performance is improved and power consumption is increased. The system comprises a scheduling unit for carrying out a processing to determine task of which processing should be executed at respective time points to shift control right to the task in accordance with the determination result, a power management unit periodically activated to carry out prediction of the power consumption of the processor and setting of operation frequency thereof, and a satisfaction degree evaluation unit activated in response to request from a scheduling module to evaluate the relationship between respective tasks and satisfactory services provided by them. Accordingly, it is possible to suppress operation frequency of the processor within the range that the satisfaction degree permits thus to carry out power saving.

3 Claims, 7 Drawing Sheets

METHOD AND APPARATUS FOR ASSIGNING TASKS IN AN INFORMATION PROCESSING SYSTEM TO OPTIMIZE POWER CONSUMPTION VERSUS PERFORMANCE OF THE SYSTEM

TECHNICAL FIELD

This invention relates to a reduction of power consumption of an information processing system, and more particularly to an information processing system and a control method therefor of the type in which the reduction in power is realized by suitably suppressing operation frequency of processor (CPU: Central Processing Unit) serving as core of data processing within the system. More specifically, this invention relates to an information processing system and a control method therefor in which the reduction in power is realized while maintaining a service quality of the system.

BACKGROUND ART

With the recent technical innovation, various personal computers (hereinafter referred to as "PC" or "system" as occasion may demand) such as the desk top type or note book type, etc., and/or work stations have been developed and come into the market. Among these equipments, personal computers of the note book type are designed and manufactured so that they are compact and light in weight by taking into consideration of portable/carriable use at the outdoor.

One feature of the note book type PC is of "battery driven type" which can be driven also by battery included therewithin. This enables use at the place where commercial power supply is not available. Battery that the note book PC includes therewithin generally takes a form of "Battery pack" in which plural chargeable type battery cells (hereinafter referred to as "secondary battery" as occasion may demand) utilizing lithium ion, etc. are connected and are packaged. While such battery pack can be re-utilized by charging, charge capacity per one operation is about two to three hours at the upmost when converted in point of operation time. In addition, charge time which is the same degree as the operation time is required. For this reason, for the purpose of elongating duration time of the battery any more, various devices for realizing reduction in power are made. It can be said that the fact that power saving function is positively introduced is also one of features of note book PCs.

In recent years, also with respect to desk top type PCs which can be inexhaustibly supplied with power by commercial power supply, from the viewpoint of ecology, power saving requirement is increased. The United States Environmental Protection Administration (EPA) has announced voluntary limitation called "Energy Star Computer program" in June, 1993 to require that power saving in the operation standby state is less than predetermined reference (drive power is less than 30 W, or less than 30% of that at the time of CPU full working). For this reason, every computer maker has made a research/development of computer products along this limitation plan.

A power saving of computer is realized by reducing, e.g., drive powers themselves of respective electric circuit components within the system. Moreover, such power saving is also realized by suitably lowering or interrupting power supply with respect to hardware components in which an operation state (activity) is lowered, or an unused state is continued. The power saving function as the latter may be also particularly called "Power Management".

As mounting form of the power management in PC, there are mentioned power OFF of LCD (Liquid Crystal Display) and its back light and stop of disk rotation motor of Hard Disk Drive (HDD), etc. Since devices or the like such as LCD unit and/or HDD, etc. take great percentage with respect to total power consumption of the system, it can be said that an effect of power saving by LCD OFF and/or HDD OFF is extremely high.

Moreover, since CPU (Central Processing Unit) takes about one fourth ($1/4$) of the total power consumption of the system, expectation with respect to power saving is high.

With respect to the liquid crystal display and bard disc unit, there has been already an outlook that power consumption is reduced. On the contrary, there is high possibility that the power consumption of CPU is further increased by high integration or realization of higher speed of operation frequency, etc. also in future. For this reason, it is deemed that an importance of power management with respect to CPU will be increased still more in future.

Typical method for realizing power management of CPU is realized by the suppression of operation frequency. Power consumption of the circuit component is determined by quantity of current passing through the transistor gate (i.e., resistor) per unit time. Namely, the power consumption is increased substantially in proportion to realization of high speed of operation frequency. Conversely, by dropping stepwise operation frequency in accordance with load state of CPU, quantity of current passing through the gate is suppressed and a reduction of the power consumption can be thus realized. By also lowering power supply voltage in accordance with drop of operation frequency, the power consumption can be further reduced.

It is to be noted that since lowering of operation frequency of CPU means lowering of performance of CPU, there exists the relationship of trade-off with respect to service quality (or degree of satisfaction of user who requests performance of the system).

For example, when CPU drivable by operation frequency above, e.g., 300 MHz continues full working at all times, battery capacity is dissipated in a short time, and all tasks do not always require full working of CPU. There exists a task in which sufficient service quality can be obtained also under operation mode of CPU which has been placed in clock down state. Alternatively, when the system is in user input standby state, there hardly exist bad influence or effect in the degree of satisfaction of user if the CPU is placed in clock down state.

On the other hand, when power management operation (i.e., clock down) of CPU is enabled during an execution of processing for which real time characteristic is required, lowering of service quality of the system is also invited as the result of the fact that performance is lowered.

In other words, real time task means processing in which there is necessity of completion before predetermined time limit (dead line), and there is mentioned, e.g., processing in which respective frames of MPEG (Moving Picture Expert Group)-compressed moving picture are reconstructed to carry out picture display, or the like. In this case, it is necessary to complete processing to MPEG-reconstruct one frame per one thirtieth sec., which is display time of frame to display it. Namely, processing of respective frames are carried out with one thirtieth sec., being as dead line, resulting in that dead line is not maintained. Thus, frames in which their processing cannot be completed before processing start of the next frame result in "frame missing" or "repetition" of frame. In general, applications including moving picture reproduction/synthesis or sound synthesis/recognition, etc. not only requires real time characteristic, but also applies heavy load to the CPU.

When power management is caused to take preference to lower performance of CPU during execution of such a real time processing, processing is not completed before deal line. Thus, the meaning that processing is continued is eliminated. In addition, when dead line is not kept, service quality of the system (i.e., degree of satisfaction of user) is lowered as the result of the fact that the frame missing or a repetition of frame takes place.

To summarize the above-mentioned facts, since power management of CPU means lowering of its performance, there results in trade-off relationship with respect to service quality of the system. Accordingly, it is preferable in view of optimization of the entirety of the system that power management of CPU is carried out within the range that the response time of the system permits.

DISCLOSURE OF THE INVENTION

An object of this invention is to provide an excellent information processing system and a control method therefor which are capable of realizing power-saving by suitably suppressing operation frequency of processor serving as the core of data processing within the system.

Another object of this invention is to provide an excellent information processing system and a control method therefor which are capable of realizing power-saving by suppressing operation frequency of processor while maintaining service quality of the system.

A further object of this invention is to provide an excellent information processing system and a control method therefor which are capable of realizing power-saving by suppressing operation frequency of processor within the range that response time of the system permits.

This invention has been made in view of the above-mentioned problems, and is directed to an information processing system including a processor of which operation speed is adjustable wherein the system is of the type in which, with increase of operation speed of the processor, service quality is improved and power consumption is increased, the information processing system comprising:

(A) scheduling means for carrying out processing to select task processed next in the processor to shift control of processor to the selected task in accordance with selection result;

(B) power management (control) means periodically activated to carry out prediction of power consumption of the processor and setting of operation frequency; and (C) satisfaction degree evaluation means activated in response to request from the scheduling means to evaluate degree of satisfaction with respect to service that task provides.

Moreover, this invention is directed to a control method for an information processing system including a processor of which operation speed is adjustable and of the type in which, with increase of operation speed of the processor, service quality is improved and power consumption is increased, the control method comprising:

(A) a scheduling step of carrying out a processing to select task processed next in the processor to shift control of the processor to the selected task in accordance with the selection result;

(B) a power management (control) step periodically activated to carry out prediction of power consumption of the processor and setting of operation frequency; and (C) a satisfaction degree evaluation step activated in response to request from the scheduling step to evaluate degree of satisfaction with respect to service that task provides.

Further, this invention is directed to a program providing medium for providing, in a material and computer readable form, computer program for executing, on a computer system of the type in which, with increase of operation speed of a processor of which operation speed is adjustable, service quality is improved and power consumption is increased, processing for controlling trade-off relationship formed between the service quality and the power consumption in the computer system, the computer program comprising:

(A) a scheduling module for carrying out a processing to select task processed next in the processor to shift control of the processor to the selected task in accordance with selection result;

(B) a power management (control) module periodically activated to carry out prediction of power consumption of the processor and setting of operation frequency; and (C) a satisfaction degree evaluation module activated in response to request from the scheduling means to evaluate degree of satisfaction with respect to service that task provides.

Further, this invention is directed to a task assignment control method in an information processing system of the type of carrying out management/control of execution of program by a processor in task units, the task assignment control method comprising:

(A) a step of acquiring additive water variable indicating the degree of thinning processing relating to task;

(B) a step of acquiring water quantity variable which is decreased in accordance with occurrence of overload of the processor and becomes close to a predetermined value at a fixed ratio every unit time;

(C) a step of adding the water quantity variable to the additive water variable of task;

(D) a step responsive to the fact that the additive water variable is beyond a threshold value to assign task and to decrease a predetermined value from the additive water variable of the task; and (E) a step responsive to the fact that additive water variable is not beyond the threshold value to try to cancel task execution.

Further, this invention is directed to a task assignment control apparatus in an information processing system of the type of carrying out management/control of execution of program by a processor in task units, the task assignment control apparatus comprising:

(A) means for acquiring additive water variable indicating degree of thinning processing relating to task;

(B) means for acquiring water quantity variable which is decreased in accordance with occurrence of overload of the processor and becomes close to a predetermined value at a fixed ratio every unit time;

(C) means for adding water quantity variable to additive water variable of task;

(D) means responsive to the fact that the additive water variable is beyond a threshold value to assign task and to decrease a predetermined value from the additive water variable of the task; and (E) means responsive to the fact that the additive water variable is not beyond the threshold value to try to cancel task execution.

In addition, this invention is directed to a program providing medium for providing, in a material and computer readable form, computer program for executing, on a computer system of the type of carrying out management/control of execution of program by a processor in task units, processing for controlling task assignment in the computer system, the computer program comprising:

(A) a step of acquiring additive water variable indicating degree of thinning processing relating to task;

(B) a step of acquiring water quantity variable which is decreased in accordance with occurrence of overload of the processor and becomes equal to a predetermined value at a fixed ratio every unit time;

(C) a step of adding the water quantity variable to the additive water variable of the task;

(D) a step responsive to the fact that the additive water variable is beyond a threshold value to assign task and to decrease a predetermined value from additive water variable of the task; and (E) a step responsive to the fact that the additive water variable is not beyond the threshold value to try to cancel task execution.

In accordance with the information processing system and the control method therefor according to this invention, such an approach is employed to evaluate target satisfaction degree with respect to the entirety of the information processing system on the basis of weighted mean of satisfaction degree relating to power consumption and satisfaction degree relating to service quality of each task, and to calculate satisfaction degree relating to power consumption on the basis of predictive value of power consumption of the processor to carry out setting of operation frequency of the processor such that satisfaction degree relating to power consumption becomes close to target satisfaction degree of the entirety of the system. Accordingly, it is possible to suppress operation frequency of the processor to realize power saving while maintaining service quality of the system.

In addition, in accordance with the information processing system and the control method therefor according to this invention, operation frequency of the processor is suppressed within the range that response time of the system permits, thus making it possible to realize power-saving.

The program providing medium according to this invention is a medium which provides, in a material and computer readable form, computer program with respect to, e.g., widely used computer system which can execute various programs codes. The medium is detachable carrying memory medium such as CD (Compact Disc), FD (Floppy Disc), MO (Magneto-Optical disc), etc., transmission medium such as network (network is not required to have radio or wire), etc. and the like. The form is not specifically limited.

Such a program providing medium defines cooperative relationship in structure or function between computer program and providing medium for realizing function of a predetermined computer program in the computer system. In other words, by installing a predetermined computer program into computer system through the program providing medium according to this invention, cooperative action is exhibited in the computer system. Thus, operations/effects similar to those of the information processing system and the control method therefor can be provided.

Still further objects, features and merits of this invention will be apparent by further detailed explanation based on embodiments of this invention which will be described later and the attached drawings.

BEST MODE FOR CARRYING OUT THE INVENTION

Explanation will now be given in detail with reference to the attached drawings in connection with the best mode for carrying out this invention.

Figure 1:
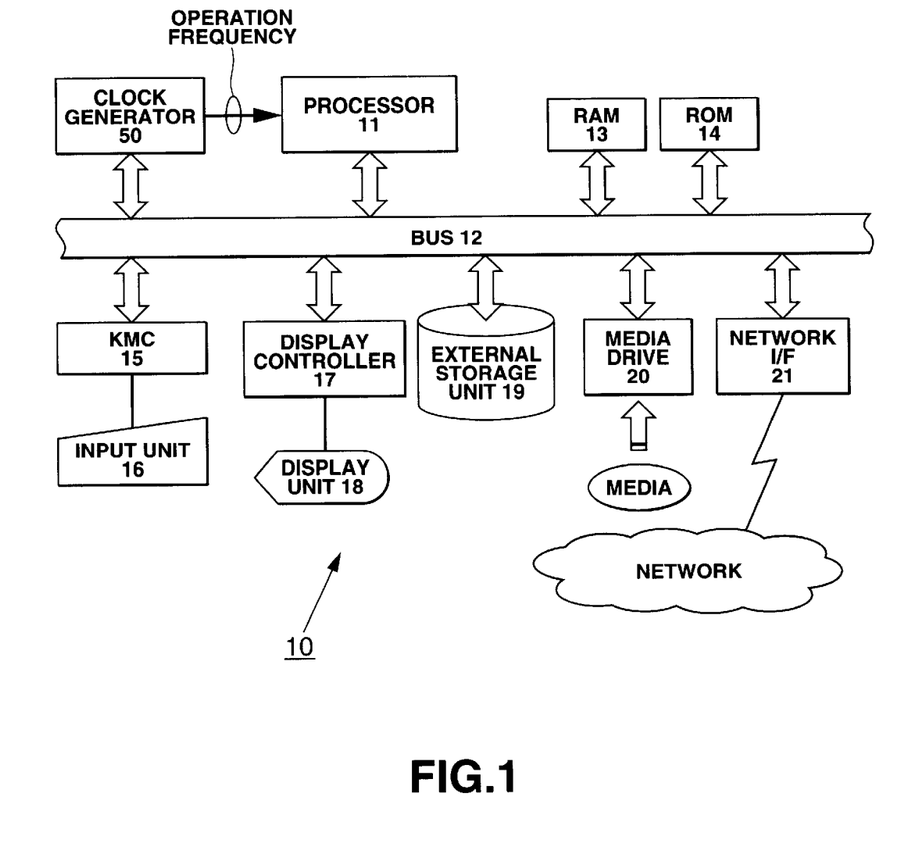
FIG. 1 is a view showing, in a model form, hardware configuration of a typical information processing suitable for realizing this invention.

Hardware configuration of an information processing system 10 suitable for realizing this invention is shown in a model form in FIG. 1. The information processing system 10 may be widely used computer system, e.g., called "work station" or "personal computer". Respective components will be described below.

A processor 11 is a main controller for controlling, in a supervised manner, operation of the entirety of the information processing system 10, and is generally called CPU (Central Processing Unit) or MPU (Micro Processing Unit). The processor 11 executes various application programs under operating system (OS).

The processor 11 of this embodiment is driven in synchronism with an operation clock signal of a predetermined frequency which is delivered from clock generator 50 (which will be described later). Moreover, the processor 11 is capable of changing operation frequency during working. According as the operation frequency increases, processing speed, i.e., performance is improved, and power consumption is also increased.

The processor 11 is interconnected with other respective peripheral units through a bus 12. The bus 12 is a common signal transmission path composed of a large number of bus signal lines such as address bus, data bus and control bus, etc. For example, PCI (Peripheral Component Interconnect) bus, or ISA (Industry Standard Architecture) bus corresponds to such bus. Respective bus-connected peripheral units include I/O registers to which specific I/O addresses (or memory addresses) are assigned, respectively. The processor 11 (in more practical sense, software program that the processor 11 executes) designates. I/O address, thereby making it possible to read/write data or command with respect to I/O registers of the peripheral units to execute desired control.

A RAM (Random Access Memory) 13 is a writeable memory used for loading program code that the processor 11 executes and for temporarily storing working data. The RAM 13 is ordinarily comprised of plural DRAM (Dynamic RAM) chips.

A ROM (Read Only Memory) 14 is a read only non-volatile memory into which storage data are permanently written at the time of manufacturing. In the ROM 14, e.g., there are stored self diagnostic test program (POST) carried out at the time when power is turned ON of the system 10 and code groups (BIOS) for executing hardware input/output operations. The ROM 14 may be of erasable/rewriteable type, such as, for example, EEPROM (Electrically Erasable and Programmable ROM).

A keyboard/mouse controller (KMC) 15 is a unit for receiving command input, etc. from user through an input unit 16 such as keyboard or mouse, etc. The KMC 15 issues interruption request with respect to the processor 11 in response to the fact that there takes place character input from the keyboard or coordinate designation input from the mouse.

A display controller 17 is a peripheral controller for controlling picture describe processing at a display unit 18 and is provided with frame buffer (not shown) for temporarily storing picture describe data. The display unit 18 is comprised of CRT (Cathode Ray Tube) display or LCD (Liquid Crystal Display) etc. GUI (Graphical User Interface) working picture (window) including menu, etc. for processing data or command input is displayed on the screen.

An external storage unit 19 is a rewriteable and non-volatile storage (memory) unit of relatively large capacity, such as, for example Hard Disc Drive (HDD), and is used for storing data file and for installing program file.

A media drive 20 is a unit for exchangeably loading media of the cartridge type to read/write data carried on the media surfaces. As media mentioned here, there are mentioned detachable from the system 10 and carrying type media such as MO (Magneto-Optical disc), CD-ROM and DVD (Digital Versatile Disc), etc. For example, program codes for power management which have embodied this invention are materially stored on media in file form such that computer can read and is circulated through media. Thus, such program codes can be installed at the external storage unit 19 by the media drive 20.

A network interface 21 is a unit for network-connecting the information processing system 10 in accordance with a predetermined communication protocol (e.g., TCP/IP (Transmission Control Protocol/Internet Protocol) Protocol). On the network, there exist plural computer systems (hereinafter referred to as "remote system" as occasion may demand, not shown). Between respective systems on the network, it is possible to carry out, in a material form, transmission of program or data that computer can read, e.g., by packet exchange system. The information processing system of this embodiment can receive supply of program file for power management (control), etc. which has embodied this invention via network from remote system.

A clock generator 50 is a unit for delivering a clock signal for synchronous drive to the processor 11, etc. The clock generator 50 of this embodiment can adjustably control frequency of output clock signal, and the detail thereof will be described later.

It is to be noted that, for the purpose of actually constituting the information processing system 10, many hardware components are required in addition to the components shown in FIG. 1. Since these components are well known for the skilled in the art and do not constitute the gist of this invention, they are omitted in this specification. (For example, the information processing system 10 includes real time clock for counting real time (system time), but is omitted in FIG. 1). In addition, for avoiding complexity of the drawing, connections between respective hardware blocks in the figure are illustrated in an abstracted manner.

Figure 2:
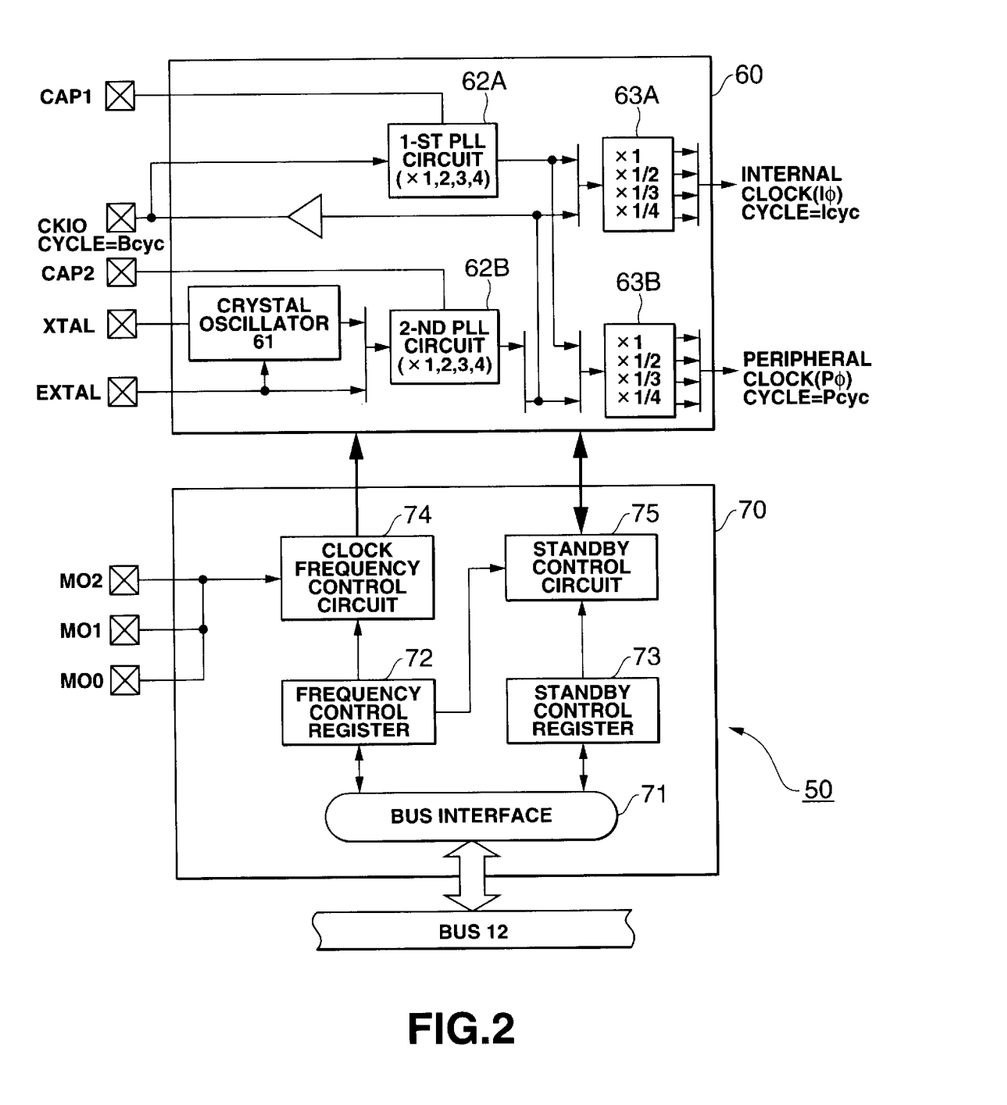
FIG. 2 is a view showing, in a model form, internal configuration of clock generator for delivering operation clock to processor.

The internal configuration of the clock generator 50 is shown in model form in FIG. 2. As shown in this figure, the clock generator 50 is composed of a clock pulse generating section 60 and a clock pulse generation control section 70. Respective components will now be described.

The clock pulse generating section 60 is composed of a crystal oscillator 61, a first PLL (Phase Lock Loop) circuit 62A, a second PLL circuit 62B, a first frequency divider 63A and a second frequency divider 63B. The crystal oscillator 62 generates pulse of a predetermined period based on the material characteristic of crystal, and respective PLL circuits 62A and 62B carry out multiplication of this generated pulse period. In addition, the respective frequency dividers 63A and 63B frequency-divide the period of pulse, thus making it possible to generate a frequency of predetermined value to output it to the external. The clock pulse generating section 60 of this embodiment is adapted so that multiplication ratio and frequency division ratio are software-programmable, and undergoes control of the clock pulse generation control section 70.

The clock pulse generation control section 70 is connected to the bus 12 and comprises an I/O register to which predetermined I/O address is assigned. One portion of the I/O register is used (I/O address is assumed to be, e.g., #fffff 80) as a Frequency Control Register (FRQCR) 72, and the other portion is used as a Standby Control Register (STBCR) 73. Transferred data and/or command in the state where processor 11 (in more practical sense, program codes that the processor 11 executes) are caused to undergo addressing are written into such I/O registers 72 or 73 via a bus interface 71.

Into the frequency control register 72, multiplication ratio and frequency division ratio for controlling the operation of the clock pulse generating section 60 are written. Namely, when the processor 11 designates I/O address #ffffff 80 to update multiplication ratio and frequency division ratio of the frequency control register 72, a clock frequency control circuit 74 changes, in a response thereto, multiplication ratios of the PLL circuits 62A, 62B and frequency division ratios of the frequency dividers 63A, 63B within the clock pulse generating section 60 to change frequency of clock delivered to the processor 11 to designated value.

Moreover, when standby start/end command (tentative name) is written into the standby control register, a standby control circuit 75 places the clock pulse generation section 60 in standby mode or returns the state thereof from the standby mode. It is to be noted that since the standby mode itself is not directly related to the gist of this invention, explanation is not given any more in this specification.

It is the premise that the processor 11 used in this embodiment has a configuration capable of controlling power consumption and performance (i.e., degree of satisfaction with respect to real time task) by changing operation frequency that the clock generator 50 delivers. Further, in the following description, it is assumed that, for convenience, power consumption of the processor 11 is substantially proportional to its operation frequency.

In addition, the processor 11 of this embodiment executes, for suitably controlling trade-off relationship formed between the performance and power consumption thereof, the following three functional modules at the background for executing task that application requests.

(1) Scheduling Module

The scheduling module determines which processing of task the processor 11 should executes at respective time points to carry out, in accordance with determination result, processing to shift control right to task.

(2) Power Management Module

The power management module is periodically activated to carry out prediction of power consumption and setting of operation frequency of the processor 11. More specifically, such an approach is employed to predict power consumption of the processor 11 to calculate degree of satisfaction relating to power consumption, and to set an operation frequency such that degree of satisfaction relating to power consumption becomes closest to the target satisfaction degree of the entirety of the system 10. The target satisfaction degree is calculated by satisfaction degree module which will be described in the following paragraph.

(3) Satisfaction Degree Evaluation Module

The satisfaction degree evaluation module evaluates to what degree respective tasks can provide services that they can satisfy. The satisfaction degree evaluation module is activated in response to request from the scheduling module. In this embodiment, it is assumed that target satisfaction degree with respect to the entirety of the system 10 is calculated on the basis of weighted mean of satisfaction degree relating to power consumption and satisfaction degree relating to service quality of each task.

Evaluation of satisfaction degree is carried out by calculating two kinds of satisfaction degrees of satisfaction degree in which effect of thinning of task is taken into consideration and satisfaction degree in which effect of thinning is not taken into consideration. In this embodiment, it is assumed that degree of satisfaction is represented by real numbers within the range from 0.0 to 1.0.

Figure 3:
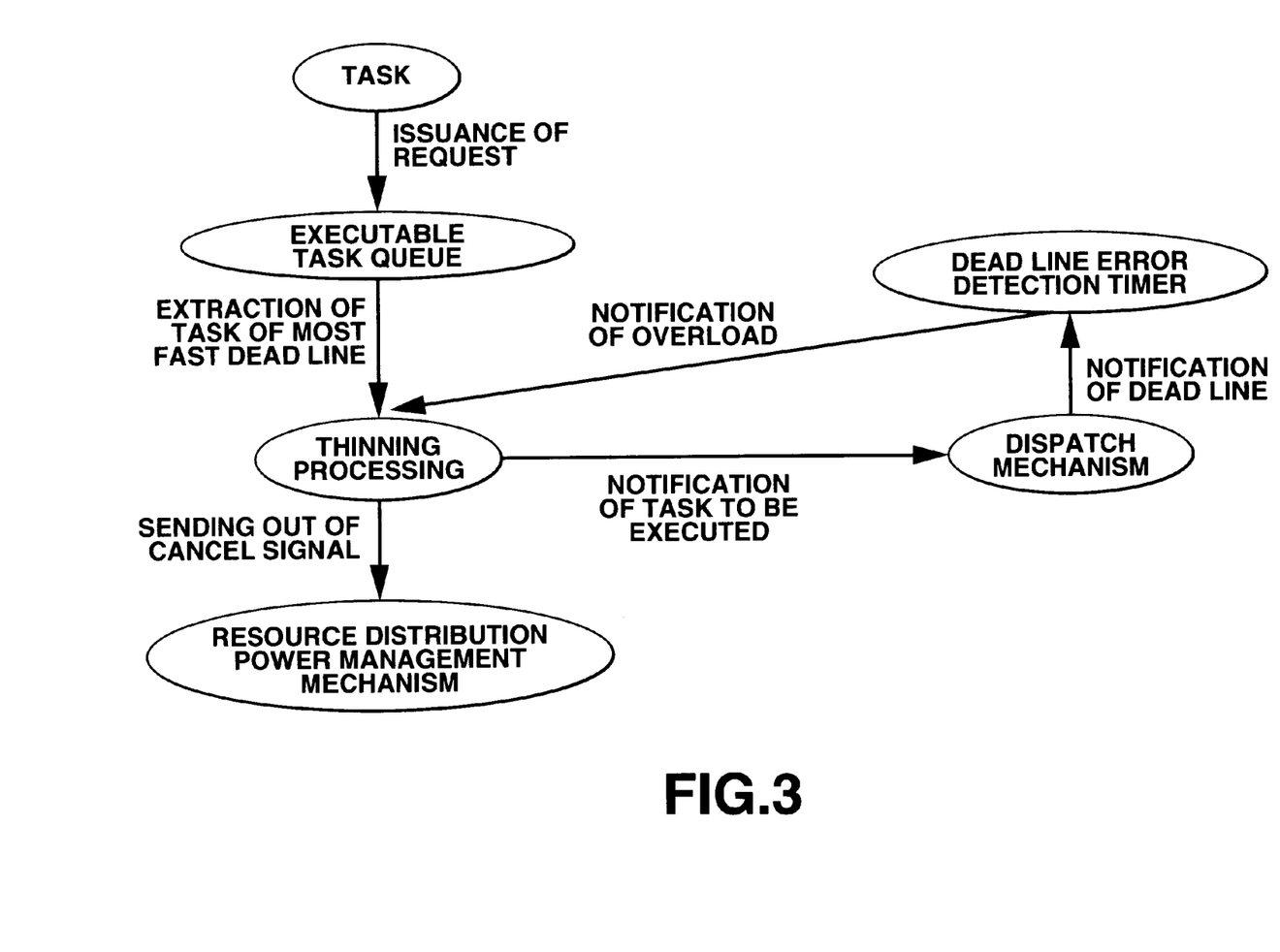
FIG. 3 is a view showing, in a model form, scheduling mechanism in the information processing system.

In the information processing system 10 according to this embodiment, scheduling operations of respective tasks that the processor 11 executes are carried out while making reference to trade-off relationship formed between performance and power consumption of the processor 11. In FIG. 3, there is shown, in a model form, scheduling mechanism in the information processing system 10.

Application program executed at the processor 11 is caused to undergo management/control in units of task. Task that application requests to execute is inserted into queue called executable task queue.

Task in which dead line is most fast of tasks stored in the executable task queue is preferentially extracted. For example, task in which request of real time characteristic is high as in the case of processing to carry out restore/display of MPEG data is preferentially extracted.

When dispatch mechanism receives notification of task to be executed, it takes out such task from the executable task queue to start execution of task. In addition, dead line of task is notified to dead line error detection timer.

The dead line error detection timer sets timer at dead line to detect whether or not task is completed until this timer is expired, i.e., dead lines of respective tasks are observed or obeyed. When task which is not completed before deadline, i.e., dead line error is detected, overload of processor 11 is notified for thinning processing. The deadline error detection timer is a timer having a function to produce interruption with respect to the processor 11 at set time, and this timer can set plural times at the same time.

In the thinning processing, cancel signal is activated for the purpose of cancelling execution of this task in response to notification of overload.

The resource assignment/power management (control) mechanism receives the cancel signal to control assignment of processing resource and power management of the processor 11 so that there results trade-off relationship formed between performance and power consumption of the processor 11.

It is to be noted that, in the above-described thinning processing, such an approach is employed to carry out processing to thin a starting of real time task to hold, at predetermined level, service quality that the system 10 provides with respect to user (i.e., degree of satisfaction). In the thinning processing, for the purpose of controlling timing of dispatch of task, there are introduced two variables of an additive water variable and a water quantity variable.

The water quantity variable is a variable indicating ratio for decreasing load of the system 10 by thinning execution operations of respective tasks, wherein a predetermined quantity is decreased by occurrence of overload and this variable periodically becomes equal to 1.0 at predetermined ratio. On the contrary, the additive water variable is a variable indicating capacity equivalent to comparison result of satisfaction degree or average satisfaction degree of service quality and takes value within the range from 0.0 to 2.0.

When the water quantity variable value is added to the additive water variable value so that the additive water variable value overflows (i.e., beyond 1.0), the task having the most fast dead line is transferred to the dispatch mechanism. At this time, the additive water variable value is decreased by 1. On the other hand, when the additive water variable value does not overflow even if the water quantity value is added, it is judged that a current state is an overload state to issue cancel signal to thin this task. The cooperative operation using the water quantity variable and the additive water variable is equivalent to an operation such that when water is added so that water reservoir quantity is beyond a predetermined value, additive water is inverted and is discharged (i.e., task is dispatched), but when water reservoir quantity is not beyond the predetermined value, additive water is not inverted (i.e., task is not dispatched).

Figure 4:
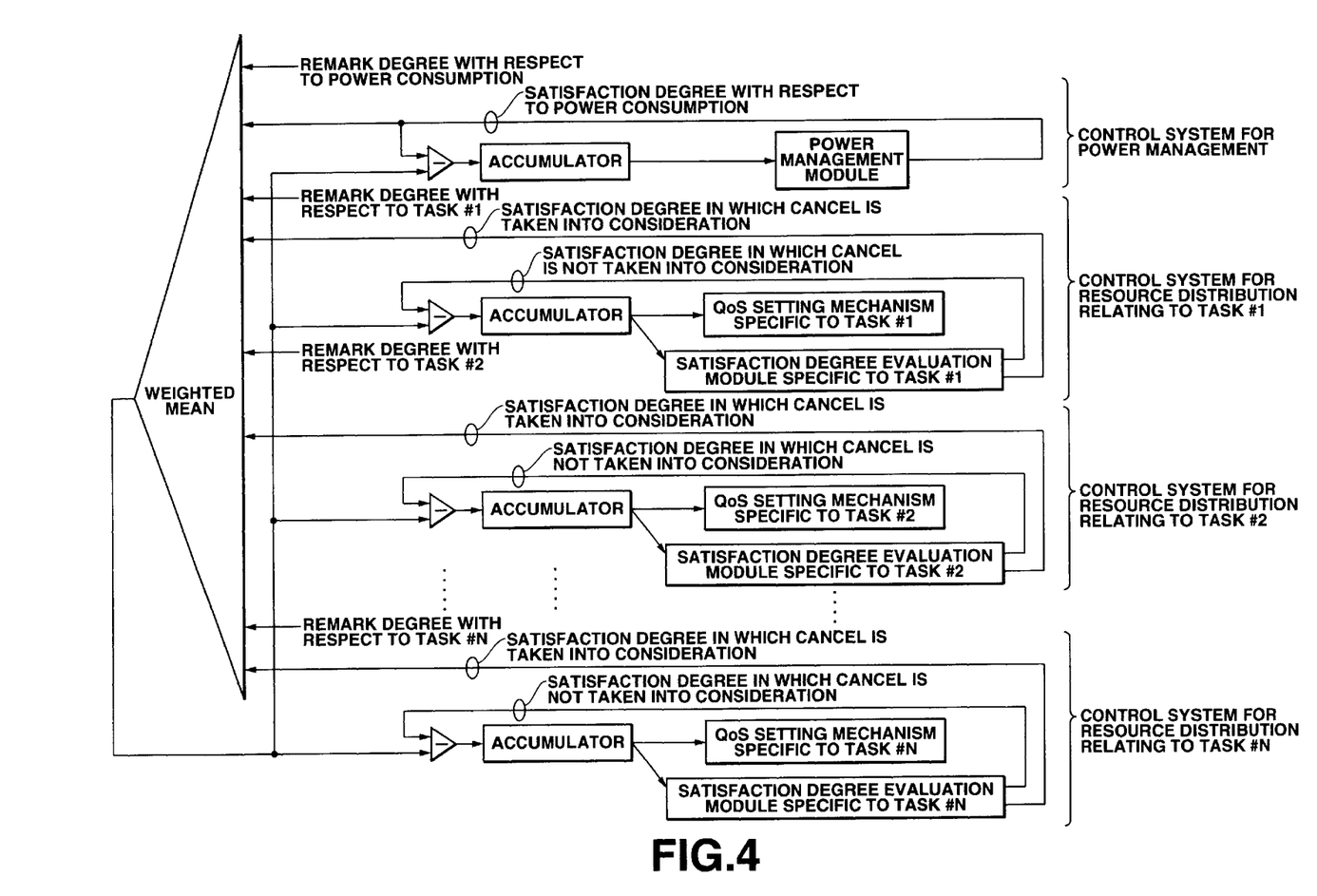
FIG. 4 is a view showing, in a model form, mechanism of resource allotment/power management in information processing system 10.

In FIG. 4, there is illustrated, in model form, mechanism of resource distribution/power management in this embodiment. As shown in this figure, in the resource distribution and the power management, there is determined weighted mean of satisfaction degree with respect to power consumption and satisfaction degree with respect to service quality every task. Further, the total satisfaction degree of system 10 that this weighted mean indicates is fed back. Thus, operation frequency of power management (control), i.e., operation frequency of processor 11 is determined.

In calculating weighted mean, weighting factors may be applied in consideration of power consumption or degree of remark with respect to each task. The degree of remark with respect to task means, e.g., priority of task execution.

In the control system for power management, difference between satisfaction degree with respect to power consumption calculated by the power management module and satisfaction degree with respect to the entirety of the system 10 that weighted mean value indicates is stored into accumulator, and output of this accumulator is fed back to the power management module.

On the other hand, control systems for resource distribution are provided one by one every respective tasks during execution.

In the control system for resource distribution relating to respective tasks, satisfaction degree evaluation module with respect to task outputs service satisfaction degree with respect to the case where cancellation of task is taken into consideration and service satisfaction degree with respect to the case where such cancellation is not taken into consideration. Among them, weighted mean is calculated by using satisfaction degree in which cancellation is taken into consideration.

Figure 5:
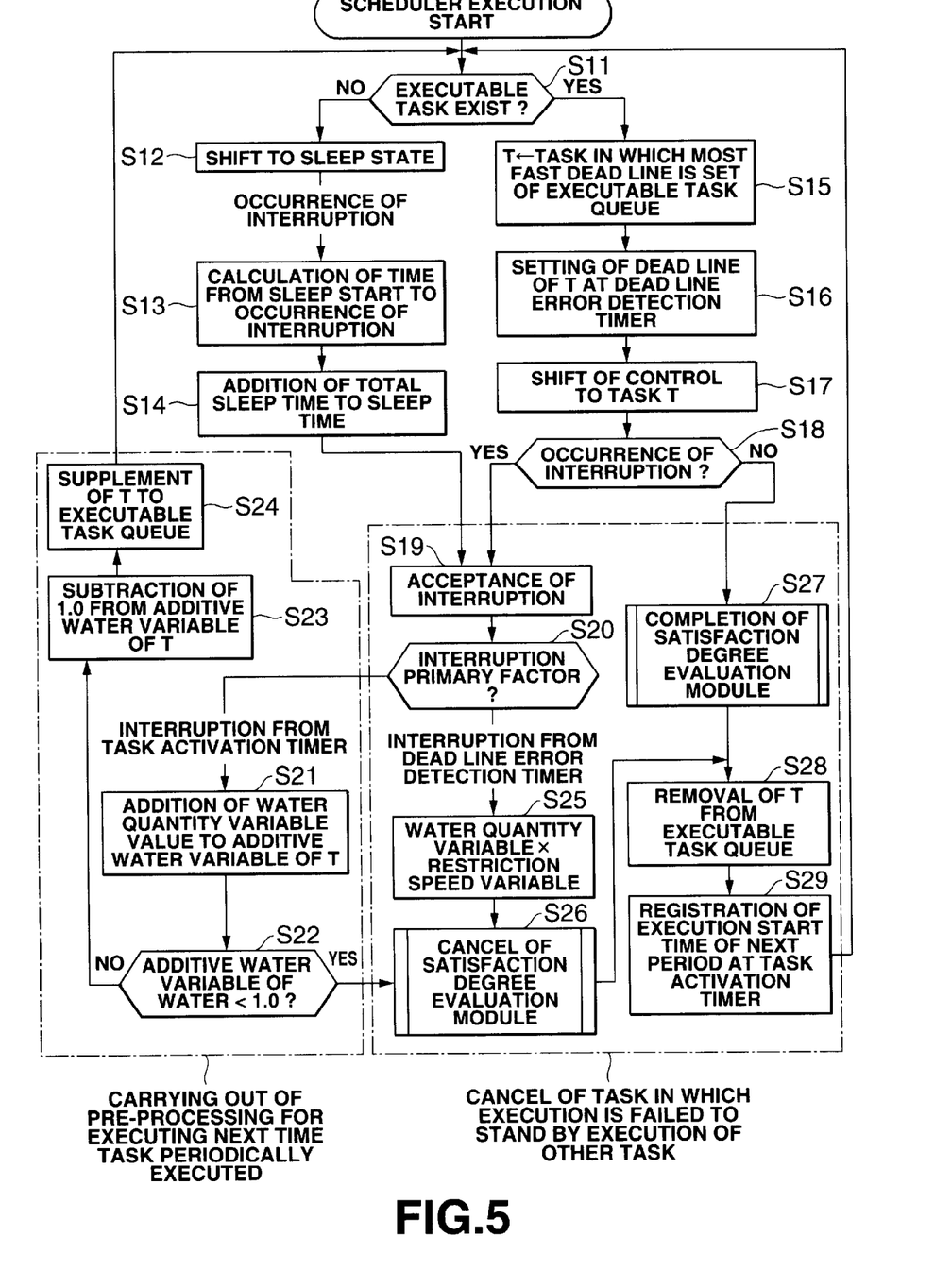
FIG. 5 is a flowchart showing processing procedure executed in scheduling module.

Explanation will now be given in connection with processing in scheduling module. In FIG. 5, processing procedure executed in the scheduling module is shown in the form of flowchart. Respective steps of this flowchart will now be described.

Initially, at step S11, whether or not executable task exists in the executable task queue is judged. The executable task queue has data structure which holds, in list form, task in executable state requested from application. In this embodiment, mounting is made such that dead lines are taken out in order from the most fast one.

When the executable task does not exist, the processing procedure proceeds to step S12. Thus, the operating state of the system 10 shifts to sleep state. The sleep state is the state in which the operating state of the system 10 is literally lowered. As the method of placing the system 10 in sleep state, there are conceivable various forms such as, in addition to stopping of the operation of the processor 11, interruption of power to the peripheral units such as hard disk unit 19 or display 18, etc. It is to be noted that since the sleep operation itself is not directly related to the gist of this invention, explanation is not given any more in this specification.

When any interruption factor takes place with respect to the system 10 under the sleep state, the system 10 wakes up to return to the state of ordinary operation. An example of interruption factor is occurrence of user input through input unit 16 such as keyboard or mouse, etc.

The system 10 calculates sleep time, i.e., time from sleep start to occurrence of interruption (step S13). For calculation of such time, system time that the real time clock (previously described) counts is utilized. Further, the calculated sleep time is added to the total sleep time of the system 10 (step S14). This "total sleep time" is variable that the power management module uses for the purpose of calculating utilization percentage (ratio) of the processor 11 (which will be described later), and means total sleep time from the time when the power management module last activates (starts) up to current time.

On the other hand, in the case where executable task exists at step S11, the processing procedure proceeds to step S15 to carry out substitution of task in which the most fast dead line is set into variable T among executable task queues. Then, dead line of the task T is set at the dead line error detection timer (step S16) to give control right of the system 10 to the task T (step S17). The dead line error detection timer is timer having function to generate interruption with respect to processor 11 at set time, and can set plural times at the same time (previously described).

Further, after interruption takes place in the sleep state and sleep time is processed (step S14), or in the case where interruption takes place during execution of the task T (step S18), the processing procedure proceeds to step S19 to receive interruption request thereafter to verify interruption cause at step S20.

In the case where interruption cause is interruption from the task activation timer, a series of processing formed by steps S21 to S24 are carried out. In other words, such series of processing are pre-processing for executing, next time, task periodically executed (hereinafter referred to as task T). In addition, "task activation timer" mentioned here is timer having a function to generate interruption with respect to the processor 11 at set time, and can set plural times at the same time.

At step S21, water quantity variable is added to additive water variable that the task has.

The additive water variable of the task T is variable indicating capacity equivalent to comparison result of the degree of satisfaction of service quality relating to task T or average satisfaction degree thereof, and takes value within the range from 0.0 to 2.0. The additive water variable is used for thinning real time task (described later).

Moreover, the water quantity variable is adapted so that a predetermined quantity is decreased by occurrence of load with respect to processor 11 and periodically becomes close to 1.0 at a predetermined ratio. The water quantity variable takes value within the range from 0.0 to 1.0. Value of the water quantity variable indicates ratio in which load of the processor 11 is decreased by thinning executions of respective tasks. Namely, when water quantity variable value is 1.0, any thinning operation is not carried out. When water quantity variable value is 0.0, all tasks are thinned, resulting in the state where any task is not activated (started).

At step S22, there is carried out judgment as to whether or not additive water variable of task T is smaller than 1.0. When the judgment result is negative, 1.0 is subtracted from additive water variable of task T (step S23) to supplement task T to executable task queue (step S24). Thus, the processing procedure returns to the step S11. In addition, when the judgment result at the step S22 is affirmative, cancel routine (which will be described later) of satisfaction degree evaluation module is called.

The cooperative operation using water quantity variable and additive water variable at the steps S21 and S22 is equivalent to an operation such that when water is added so that water reservoir quantity is above a predetermined value, additive water is inverted so that water is discharged (i.e., task is dispatched), whereas when water reservoir quantity is less than the predetermined value, additive water is not inverted (i.e., task is not dispatched).

On the other hand, in the case where interruption cause is interruption from the dead line error detection timer at the step S20, processing formed by steps S25 to S29 is carried out. In other words, this processing is processing for cancelling task which has failed in execution and for standing by execution of other task.

At step S25, water quantity variable is multiplied by restriction or squeezing speed variable to call cancel routine (which will be described later) of satisfaction degree evaluation module (step S26). The "restriction speed variable" mentioned here is variable indicating ratio to decrease water quantity variable value when the system 10 is brought into overload state. The squeezing speed variable value takes real number within the range from 0.0 to 1.0, and, e.g., designer of the system 10 can freely set such value in consideration of characteristic of application and performance of the system 10.

After cancel processing of the satisfaction degree evaluation module is completed, the processing procedure proceeds to step S28 to remove the task T from the executable task queue.

Then, after execution start time of the next period is registered at task activation timer, the processing procedure returns to the step S11.

Moreover, in the case where interruption does not take place at the step S18, satisfaction degree evaluation module completion procedure is called to complete this module (step S27). Then, after steps S28 and S29 are executed with a view to carrying out processing to cancel task which has failed in execution to stand by execution of other task, the processing procedure returns to the step S11.

Explanation will now be given in connection with processing in the power management module.

The power management module is activated every time determined by the system 10 (e.g., 10 mili seconds). Further, by making reference to total sleep time (previously described) set by the scheduling module, utilization factor of the processor 11 is calculated. Further, predictive value of power consumption of the processor 11 is calculated from the calculated utilization factor and current operation frequency. In the case where power consumption of the processor 11 is proportional to the operation frequency, predictive value P of power consumption can be calculated in accordance with the following formula (1).

$$P = u\, Pm\, (f/fm) + (1-u)Ps \tag{1}$$

In the above-mentioned formula (1), Pm is power consumption of the processor 11 being operated at the maximum operation frequency, Ps is power consumption of the processor 11 during sleep operation, f is operation frequency of the processor 11, fm is the maximum operation frequency of the processor 11, and u is utilization factor of the processor 11.

Figure 6:
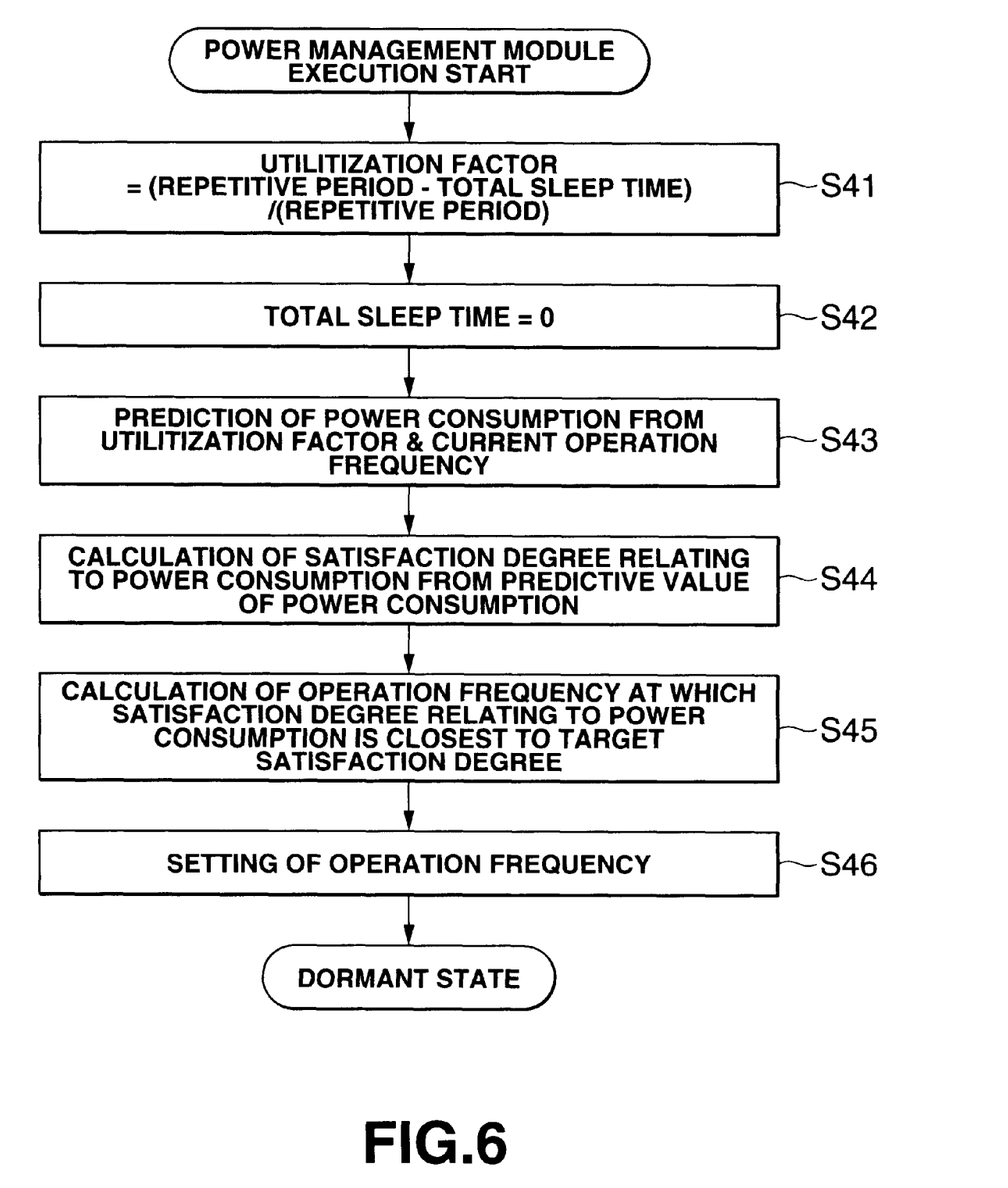
FIG. 6 is a flowchart showing processing procedure executed in power management module.

In FIG. 6, there is shown, in the form of flowchart, processing procedure executed in the power management module. Respective steps of this flowchart will now be described.

Initially, at step S41, utilization factor u of the processor 11 is calculated. The utilization factor u is determined by the calculation formula expressed as (repetition period —total sleep time)/repetition period. The total sleep time is calculated by the scheduling module (previously described).

Then, after the total time is set to be zero (step S42), power consumption P of the processor 11 is predicted (step S43). Predicted power consumption P is determined, when the above-described formula (1) is applied, on the basis of utilization factor u and current operation frequency f.

Then, satisfaction degree relating to power consumption is calculated on the basis of the calculated predictive power consumption (step S44).

Then, operation frequency in which satisfaction degree relating to power consumption becomes closest to the target satisfaction degree is calculated (step S45), in order to set the operation frequency of the processor 11.

Setting of the operation frequency is carried out by providing I/O access to frequency control register 72 in the clock generator 50 to write thereinto multiplication factor and frequency division ratio in the clock pulse generating section 60 (please make reference to the previously described facts and FIG. 2).

Then, the power management module shifts to dormant state to stand by until next activation time.

The processing in the satisfaction degree evaluation module will now be described. The satisfaction degree evaluation module is module for calculating satisfaction degree relating to each task. Moreover, the satisfaction degree evaluation module utilizes procedures such as "QoS level setting procedure", "satisfaction degree evaluation procedure", "cancel notification procedure" and "completion notification procedure", etc., which can be freely set in accordance with kind of service. It is preferable that designer of application program mounts these procedures in place of mechanism within the satisfaction degree evaluation module.

Figure 7:
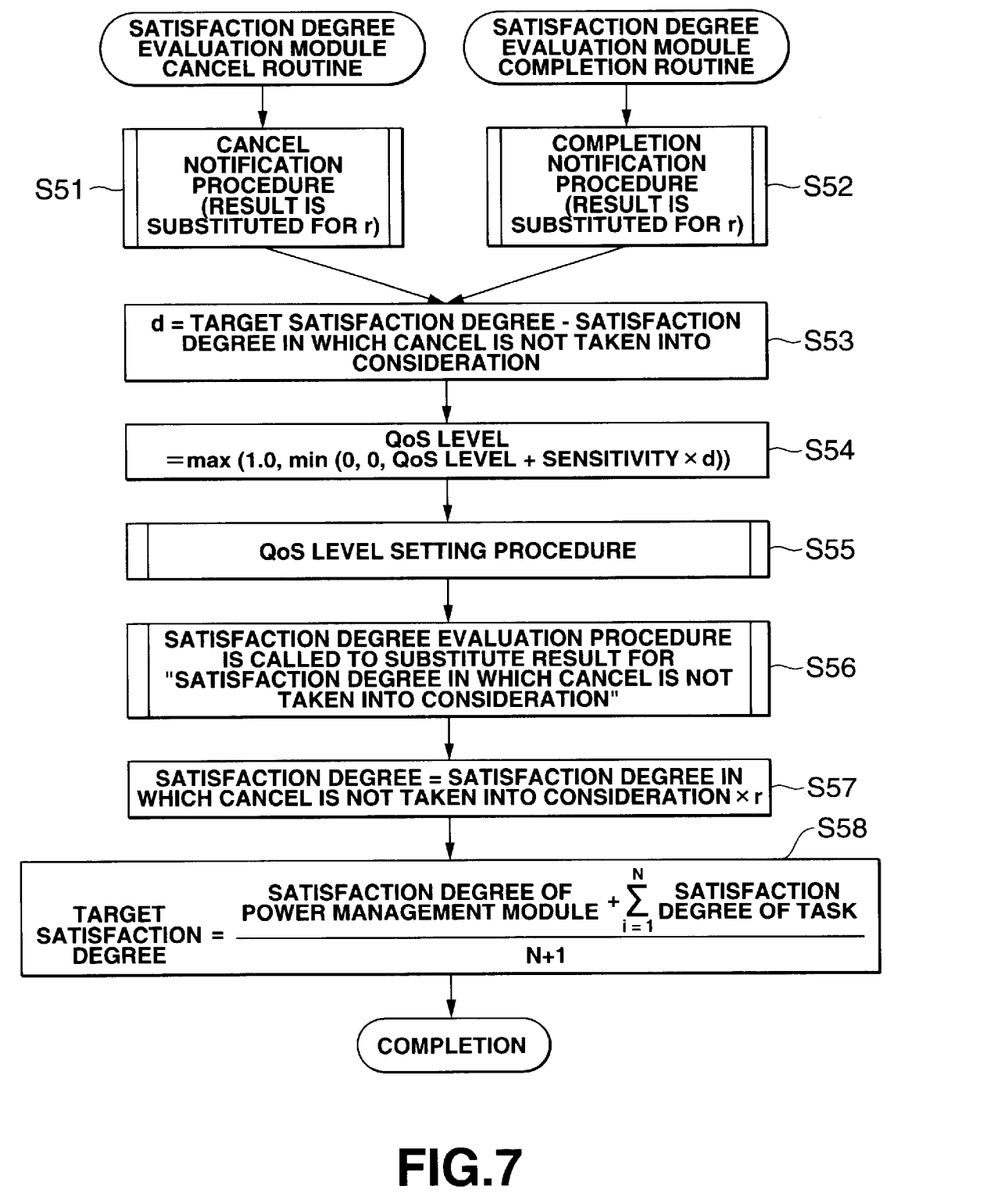
FIG. 7 is a flowchart showing processing procedure executed in satisfaction degree evaluation module.

In FIG. 7, there is shown, in the form of flowchart, processing procedure executed in the satisfaction degree evaluation module. Respective steps of this flowchart will now be described.

As shown in the flowchart of FIG. 5, the satisfaction degree evaluation module is called as cancel routine or completion routine (make reference to the previously described facts and steps S26 and S27 in FIG. 5). In the former case, cancel notification procedure is carried out (step S51). In the latter case, completion notification procedure is carried out (step S52).

Such procedures are procedure for calculating degree of decrease of satisfaction degree by thinning, and return value within the range from 0.0 to 1.0 as the result of procedure execution. When the return value is 1.0, this value has not any influence on the degree of satisfaction, but according as return value becomes close to 0.0, this value affects the degree of satisfaction to much degree. This return value is substituted for variable r.

If a task which has called such procedure is an application task, it is possible to calculate return value (i.e., degree of influence given to the degree of satisfaction), e.g., in accordance with the following table 1.

TABLE 1

| NO. OF TIMES N IN WHICH THINNING OPERATIONS ARE CONTINUOUSLY CARRIED OUT | RETURN VALUE OF PROCEDURE (DEGREE OF EFFECT) |
| --- | --- |
| 0 | 1.0 |
| 1 | 0.9 |
| 2 | 0.6 |
| 3 | 0.3 |
| 4 | 0.2 |
| 5 | 0.1 |
| 6 AND MORE | 0.0 |

Then, at step S53, value obtained by subtracting satisfaction degree in which cancel is not taken into consideration from target satisfaction degree is substituted for the variable d.

Then, at step S54, max (1.0, min (0.0, QoS level+ sensitivity×d)) is substituted for QoS (Quality of Service) level. Here, "QoS level" is a value for estimating quality of service provided with respect to user at present, and is real number value more than 0.0. In addition, sensitivity is a parameter designating to what sensitivity QoS level should be changed with respect to difference between target satisfaction degree and current satisfaction degree, and is real number value more than 0.0. The designer of the application program is required to adjust sensitivity in accordance with characteristic of application.

Then, setting procedure of QoS level is executed (step S55). This procedure is an function for setting value of QoS level. For example, consideration is made in connection with the case where frame rate of moving picture to be generated is changed in accordance with value of QoS level in the application to generate moving picture. It is assumed that value of QoS level is caused to correspond to frame rate as shown in the following Table 2.

TABLE 2

| VALUE OF QoS LEVEL | QoS LEVEL MAPPING RESULT |
| --- | --- |
| LESS THAN 0.0 | STILL PICTURE |
| 0.0 OR MORE LESS THAN 1.0 | VALUE LINEARLY INTERPOLATED IN ACCORDANCE WITH VALUE OF QoS LEVEL FROM 5 FRAMES/SEC. TO 30 FRAMES/SEC. |
| 1.0 AND MORE | 30 FRAMES/SEC. |

In the QoS level setting procedure, such an approach is employed to set frame rate on the basis of the above-mentioned Table 2 to carry out setting of various parameters so that application can suitably carry out processing corresponding to the frame rate.

Then, at step S56, satisfaction degree evaluation procedure is called to substitute its result for "satisfaction degree in which cancel operation is not taken into consideration".

The satisfaction degree evaluation procedure is a procedure for predicting to what degree satisfaction actually set QoS is given with respect to user, and returns value within the range from 0.0 to 1.0. A calculation is carried out such that according as return value becomes large, degree of satisfaction becomes large. For example, in the case of the application task for generating moving picture, it is possible to evaluate degree of satisfaction in accordance with the following Table 3.

TABLE 3

| QoS LEVEL MAPPING RESULT | DEGREE OF SATISFACTION |
| --- | --- |
| STILL PICTURE | 0.0 |
| 5~30 FRAME/SEC. | CARRYING OUT LINEAR INTERPOLATION IN ACCORDANCE WITH FRAME RATE WITHIN RANGE FROM 0.0 TO 1.0 |
| 30 FRAME/SEC. | 1.0 |

In the case of the satisfaction degree evaluation procedure in accordance with the above-mentioned Table 3, value of QoS level and the degree of satisfaction have one-to-one correspondence relationship, but its relationship is not necessarily limited to this. In the case of application task of higher request, setting may be made such that according as frame-rate low ers, degree of satisfaction is abruptly lowered.

Then, value obtained by multiplying the degree of satisfaction in which cancel operation is not taken into consideration by return value r of cancel notification procedure or completion notification procedure is substituted for degree of satisfaction (step S57).

Finally, target satisfaction degree is calculated in accordance with the following formula (2) (step S58). Thus, the entirety of this processing routine is completed.

$$\text{Target Satisfaction Degrees} = \frac{\text{Satisfaction Degree of Power Management Module} + \sum_{i=1}^{N} \text{Satisfaction Degree of Task}}{N+1} \quad (2)$$

This invention has been described in detail with respect to the specific embodiment. However, it is apparent that the person skilled in the art can carry out modification and/or substitution of this embodiment within the sprit and scope of the invention as claimed. Namely, this invention has been disclosed as exemplified mode, and should not be restrictively interpreted. To judge the gist of this invention, it is believed that reference should be made to the column of appending claims.

As described above in detail, in accordance with this invention, it is possible to provide the excellent information processing system and the control method therefor which suitably suppress operation frequency of processor serving as core of data processing within the system so that power-saving can be made.

In addition, in accordance with this invention, it is possible to provide the excellent information processing system and the control method therefor which suppress operation frequency of processor within the range that response time of the system permits so that power-saving can be made.

In accordance with the information processing system and the control method therefor according to this invention, such an approach is employed to evaluate target satisfaction degree with respect to the entirety of the information processing system on the basis of weighted mean of satisfaction degree relating to power consumption and satisfaction degree relating to service quality of each task, and to calculate satisfaction degree relating to power consumption on the basis of predictive value of power consumption of processor thus to carry out setting of operation frequency of the processor such that the degree of satisfaction relating to power consumption becomes close to target satisfaction degree of the entirety of the system. Accordingly, it is possible to suppress operation frequency of the processor to realize power-saving while maintaining service quality of the system.

What is claimed is:

1. A task assignment control method in an information processing system of a type of carrying out management/control, in task units, execution of program by processor, the task assignment control method comprising:

(A) a step of acquiring an additive water variable indicating degree of thinning processing relating to task;

(B) a step of acquiring a water quantity variable which is decreased in accordance with occurrence of overload of the processor and becomes close to a predetermined value at a predetermined ratio every unit time, (C) a step of adding the water quantity variable to the additive water variable;

(D) a step responsive to the fact that the additive water variable is beyond a threshold value to assign task and to decrease a predetermined value from the additive water variable of the task; and (E) a step responsive to the fact that the additive water variable is not beyond the threshold value to try to cancel task execution.

2. A task assignment control apparatus in an information processing system of a type of carrying out, in task units, management/control of execution of program by a processor, the task assignment control apparatus comprising:

(A) means for acquiring an additive water variable indicating degree of thinning processing relating to task, (B) means for acquiring a water quantity variable which is decreased in accordance with occurrence of overload of the processor and becomes close to a predetermined value at a fixed ratio every unit time;

(C) means for adding water quantity variable to additive water variable of task;

(D) means responsive to the fact that the additive water variable is beyond a threshold value to assign task and to decrease a predetermined value from the additive water variable of the task; and (E) means responsive to the fact that the additive water variable is not beyond the threshold value to try to cancel task execution.

3. A program providing medium for providing, in a material and computer readable form, a computer program, on a computer system of the type of carrying out, in task units, management/control of execution of program by a processor, processing for controlling task assignment in the computer system, the computer program comprising:

(A) a step of acquiring an additive water variable indicating degree of thinning processing relating to task, (B) a step of acquiring a water quantity variable which is decreased in accordance with occurrence of overload of the processor and becomes equal to a predetermined value at a fixed ratio every unit time;

(C) a step of adding water quantity variable to additive water variable of task;

(D) a step responsive to the fact that the additive water variable is beyond a threshold value to assign task, and to decrease a predetermined value from the additive water variable of the task;

(E) a step responsive to the fact that the additive water variable is not beyond the threshold value to try to cancel task execution.

* * * * *